Dec. 21, 1971 R. G. PIERSON, JR Re. 27,255

CHILDEN'S PLAY SEAT

Original Filed April 15, 1966

INVENTOR.
RAYMOND G. PIERSON, JR.
BY
Blair & Buckles
ATTORNEYS

United States Patent Office

Re. 27,255
Reissued Dec. 21, 1971

27,255
CHILDREN'S PLAY SEAT

Raymond G. Pierson, Jr., Bedford, Pa., assignor to Hedstrom Union Company, Fitchburg, Mass.

Original No. 3,427,071, dated Feb. 11, 1969, Ser. No. 643,723, June 5, 1967, which is a division of Ser. No. 549,108, Apr. 15, 1966. Application for reissue May 20, 1970, Ser. No. 39,172
Int. Cl. A47d *13/10*
U.S. Cl. 297—258 2 Claims

Matter enclosed in heavy brackets [ ] appears in the original patent but forms no part of this reissue specification; matter printed in italics indicates the additions made by reissue.

ABSTRACT OF THE DISCLOSURE

A children's foldable play seat comprises a pair of parallel, spaced-apart rockers. A flexible, bag-like seat having leg openings at the bottom of and near the front of the seat is resiliently suspended from said rockers. The leg openings are arranged to allow a child sitting in the seat to extend his legs down under the seat to engage the ground so he can propel the seat with his feet. Tubular members for mounting casters are affixed to the rockers and oriented at angles relative to the axes of the rockers so that the members are generally vertical when the lowermost portions of the rockers engage the ground.

This invention relates to a play seat for children. It relates more specifically to a play seat which is able to function selectively as a baby jumper, a rocker or a baby walker and which also can be folded easily into a compact package.

This application is a division of my copending application Ser. No. 549,108, filed Apr. 15, 1966, now U.S. Patent 3,331,631 *which is a continuation-in-part of my copending application Ser. No. 406,956, filed Oct. 21, 1964, which is, in turn, a continuation-in-part of my copending application Ser. No. 391,266, filed Aug. 21, 1964, both now abandoned.*

Most of the juvenile furniture items now on the market have only one mode of operation; they can be used in only one way by a child. Therefore, those parents who wish their children to have varied exercise and play are compelled to obtain, store and carry about several separate play items. As a practical matter, full use is usually not made of any one of those items.

Accordingly, this invention aims to provide a single item of juvenile furniture which is capable of operating as a baby jumper, a rocker or a baby walker.

A more specific object of this invention is to provide a children's play seat which is convertible between rocker and walker positions, yet which is foldable into a compact package for storage purposes.

This invention accordingly comprises apparatus possessing the features, properties and the relation of elements which will be exemplified in the article hereinafter described and the scope of the invention will be indicated in the claims.

For a fuller understanding of the nature and objects of the invention, reference should be had to the following detailed description taken in connection with the accompanying drawing, in which.

In my play seat generally, a seat assembly is resiliently suspended from a rocker assembly. The seat assembly is foldable down on the rocker assembly. Casters are installed on the rocker assembly when the play seat is used as a baby walker.

Figure 1:
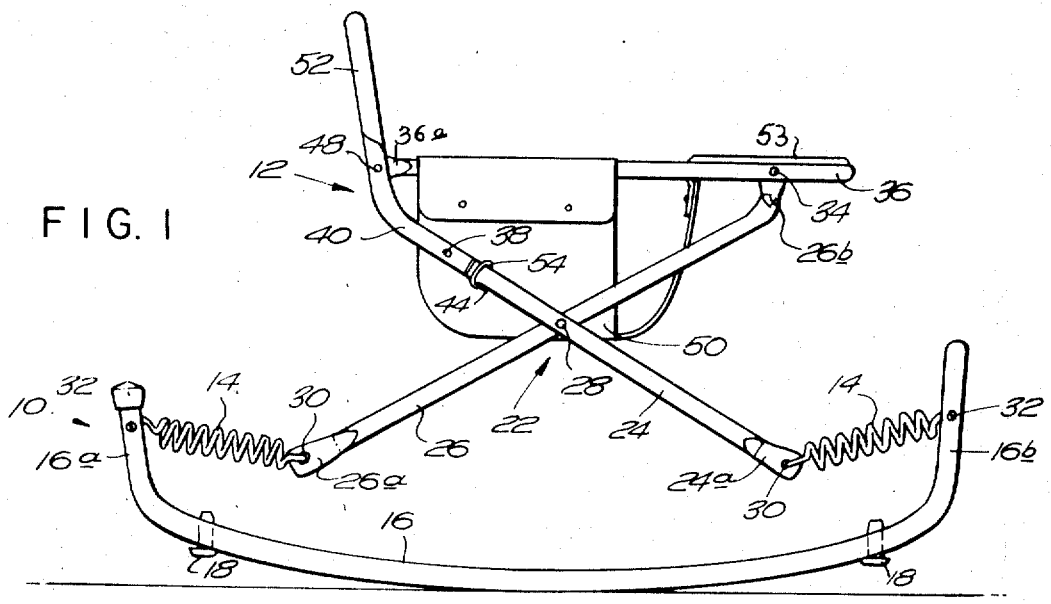
FIG. 1 is a side elevational view of a children's play seat embodying the principles of my invention.

Referring now more particularly to FIG. 1 of the drawing, my improved play seat comprises a rocker assembly indicated generally at 10 and a seat assembly indicated generally at 12 resiliently suspended from the rocker assembly by conventional flexible, resilient means, herein helical springs 14.

Figure 3:
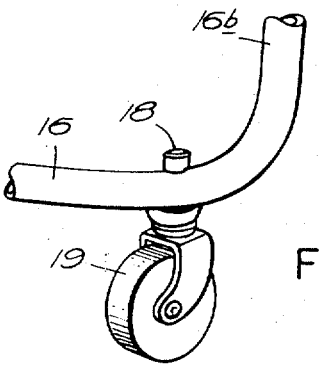
FIG. 3 is an enlarged perspective view showing a portion of the rocker of the play seat of FIGS. 1 and 2 and illustrating the adjustment of the rocker for operation of the play seat as a baby walker.

The rocker assembly 10 includes a pair of parallel, spaced-apart upwardly curved rockers 16. Only one of these has been illustrated for clarity. Each rocker 16 has an upturned rear end 16a and an upturned forward end 16b. A pair of caster mountings 18 are installed near the opposite ends of each rocker 16 below the upturned end portions 16a and 16b. The mountings 18 are adapted to receive the usual swivel-type casters 19 (FIG. 3).

The seat assembly 12 includes duplicate, upstanding side scissors frames indicated generally at 22, each consisting of a pair of crossed frame members 24 and 26 pivotally connected intermediate their ends by pins 28.

The frame members 24 and 26 have their flattened lower ends 24a and 26a, respectively, pivotally linked to the upturned end portions 16b and 16a respectively by means of the springs 14. The springs 14 are hooked through openings 30 in the portions 24a and 26a and their other ends are secured by means of bolts 32 to the upturned end portions 16a and 16b of rocker 16.

The upper ends of frame members 26 are turned up and flattened at 26b and are pivotally connected there by pins 34 to the opposite arms of a U-shaped, rearwardly curving seat supporting member 36.

The frame members 24, on the other hand, are shorter than frame members 26 and their upper ends are hingedly connected by pins 48 to the opposite arms of a generally U-shaped upwardly curving backrest member 40. Inclined detents 44 are mounted on the ends of backrest member 40. These engage and stop the ends of frame members 24 when the members 24 are in axial alignment with the arms of members 40. The flattened rear ends 36a of the seat supporting member 36 are pivotally connected by pins 48 to the opposite arms of frame member 40 at points thereon above pins 38. The frame member 36 supports a conventional bag seat or body 50, while the backrest member 40 carries the usual fabric backrest 52. Also, if desired, a tray 53 may be removably fitted into the forward end portion of the seat supporting member 36.

When the play seat is fully extended, the frame members 24 are in axial alignment with the opposite arms of backrest member 40, and the springs 14 are tensioned between the lower ends of frame members 24 and 26 and the upturned end portions 16b and 16a, respectively, of rockers 16 so that the seat 50 is normally resiliently suspended above the rocker assembly 10. To maintain the play seat in its aforesaid extended condition, slip rings 54 are provided on the arms of member 40. Rings 54 may be slid down over the detents 44 to engage them so that the frame members 24 become, in effect, rigid extensions of the opposite arms of backrest member 40.

It will be appreciated from the foregoing that the play seat may be folded for storage simply by disengaging the slip rings 54, whereupon the entire seating assembly 12 can collapse downwardly onto rocker assembly 10, with the backrest member 40 swinging forward and down about pins 38 thereby making a flat, compact package.

Figure 2:
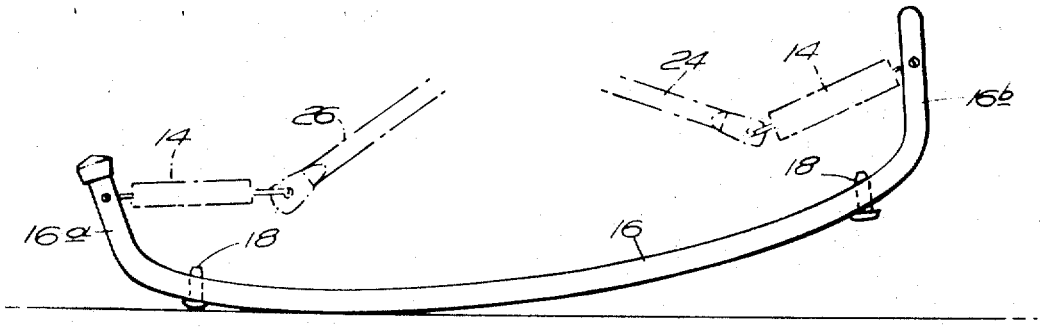
FIG. 2 is a side elevational view of a portion of the children's play seat of FIG. 1 showing the seat adapted to function as a rocker.

Refer now to FIGS. 1 and 2 which shows my play seat adapted to function as a rocker. A child seated in at 50 is able to rock back and forth as well as to bounce p and down.

Referring now to FIGS. 1 and 3, my play seat is also apable of functioning as a baby walker. For this, the asters 19 are fitted into the mountings 18 provided in ockers 16.

It will be seen from the foregoing that I have provided single play seat which is readily convertible between a aby rocker and a baby walker. The play seat is also asily folded so that it can be carried about easily in the ar and conveniently stored in a small space. This single ay chair replaces three separate and distinct items of venile furniture.

It will thus be seen that the objects set forth above, nong those made apparent from the preceding descrip-on, are efficiently attained and, since certain changes ay be made in the above article without departing from e scope of the invention, it is intended that all matter ontained in the above description or shown in the ac-ompanying drawings shall be interpreted as illustrative nd not in a limiting sense.

Having described the invention, what is claimed as new nd secured by Letters Patent is:

1. A children's foldable play seat comprising a pair of arallel, spaced-apart rockers, a flexible, bag-like seat siliently suspended from said rockers, means defining g openings at the bottom of and near the front of said at, said leg openings being arranged and adapted to low a child sitting in said seat to extend his legs down nder said seat to engage the ground so he can propel e seat with his feet, and means for mounting casters near the opposite ends of said rockers whereby a child in the play seat can simultaneously rock back and forth and bounce up and down, each said mounting means comprising a generally tubular member affixed to one of said rockers and oriented at an angle relative to the axis of said one rocker so that said member is generally vertical when the lowermost portion of the associated rocker engages the ground.

2. A children's play seat as defined in claim 1 and further including wheel casters removably positioned in said mounting means, said casters extending below said rockers so as to support said play seat whereby a child in the play seat can simultaneously bounce up and down and walk the play seat along the floor.

References Cited

The following references, cited by the Examiner, are of record in the patented file of this patent or the original patent.

UNITED STATES PATENTS

| | | |
|---|---|---|
| 2,754,120 | 7/1956 | Green. |
| 2,758,634 | 8/1956 | Walsh et al. |
| 2,855,978 | 11/1958 | Hamilton. |
| 2,885,821 | 5/1959 | Frick. |
| 2,935,318 | 5/1960 | Stukenborg. |
| 2,974,719 | 3/1961 | McClellan. |
| 3,224,723 | 12/1965 | Moore. |

BOBBY R. GAY, Primary Examiner

G. MOORE, Assistant Examiner